United States Patent [19]

Billingsley et al.

[11] 4,368,927
[45] Jan. 18, 1983

[54] HAND BRAKE RELEASE APPARATUS

[75] Inventors: Robert H. Billingsley, St. Louis; Steven L. Jantzen, St. Charles; James R. Zimmerle, O'Fallon, all of Mo.

[73] Assignee: ACF Industries, Incorporated, New York, N.Y.

[21] Appl. No.: 261,403

[22] Filed: May 7, 1981

[51] Int. Cl.³ .............................................. B60T 15/36
[52] U.S. Cl. .......................................... 303/18; 303/2; 303/71
[58] Field of Search ....................... 188/107, 197, 216; 303/2, 18, 22 R, 24 R, 68, 71

[56] References Cited

U.S. PATENT DOCUMENTS

| | | | |
|---|---|---|---|
| 3,891,277 | 6/1975 | Cope | 303/2 |
| 3,974,899 | 8/1976 | Mita et al. | 303/71 X |
| 3,982,794 | 9/1976 | Colovas et al. | 303/71 X |
| 4,033,629 | 7/1977 | Spalding | 303/2 |
| 4,166,513 | 9/1979 | Johnson | 303/71 X |

Primary Examiner—Duane A. Reger
Attorney, Agent, or Firm—Henry W. Cummings

[57] ABSTRACT

Apparatus (1) for automatically releasing a railroad car hand brake (HB) normally maintained in its applied position. An air pressure activated cylinder (9) acts on a hand brake release (5) to release the hand brake. An air line (13) directs pressurized air from a pressurized air source to the air cylinder. A valve (27) connected in the air line is responsive to the source air pressure. The valve is normally closed but opens when source air pressure reaches a level sufficient to release the air brakes on the car. A draft load sensor (29) is positioned in the air line between the valve and air cylinder. The sensor normally blocks the air line, but unblocks it when a sufficiently great draft load is sensed. The hand brake is released only if source air pressure is sufficiently high and the draft load on the railroad car is sufficiently great.

15 Claims, 3 Drawing Figures

HAND BRAKE RELEASE APPARATUS

BACKGROUND OF THE INVENTION

This invention relates to brake release mechanisms for railroad cars and, more specifically, to a mechanism for automatically releasing a railroad car hand brake upon movement of the car.

Movement of a rail car with hand brake applied can result in putting flat spots on the wheels of the car, possible derailment of the car or damage to trucks and brakes of the car. Prior attempts have been made to address this problem. U.S. Pat. No. 591,666 issued Oct. 12, 1897, discloses a lever connected to a piston movable by a brake cylinder to which air is applied. Movement of this lever produces movement of a brake rod which, in turn, moves a second lever to disconnect a pawl from a ratchet wheel. Such an arrangement might be utilized with a rail car hand brake. U.S. Pat. No. 491,667 issued on the same date, discloses an angle cock which is opened to connect a train line to a railroad car. The cock has a handle which, when turned to open the cock, causes movement of a linkage which disconnects a pawl from a handbrake ratchet thus releasing the brake. U.S. Pat. No. 3,891,277, issued June 24, 1975, discloses an actuating valve to which air is directed. The valve has a piston movable by air pressure to open an outlet through which air is directed to a handbrake release cylinder.

The mechanisms described in these patents do produce release of a railroad car hand brake when the car's air brakes are released by trainline pressure or it is senses that the trainline is connected. There are, however, situations where the trainline is connected and the air brakes are released, but it is still necessary to keep the hand brake applied. Such a situation occurs, for example, where a train is assembled and the air brakes tested before the locomotive is connected.

SUMMARY OF THE INVENTION

Among the several objects of the present invention may be noted the provision of apparatus for automatically releasing a railroad car hand brake; the provision of such apparatus for automatically releasing the hand brake only when trainline air pressure is sufficiently high to release the air brakes on the car and the car, at the same time, is subjected to a sufficiently great draft load; the provision of such apparatus which quickly and easily releases the hand brake when the stated conditions simultaneously exist, and provision of such apparatus for maintaining the hand brake applied when the car is subjected to a static load.

Briefly, apparatus of the present invention is for automatically releasing a railroad car hand brake. A hand brake is normally maintained in its applied position. An air pressure activated unit acts on a hand brake release to force release of the hand brake. An air line directs pressurized air from a pressurized air source to the air pressure activated unit. A valve is connected in the air line and is responsive to the source air pressure. The valve is normally closed, but opens when the source air pressure reaches a level sufficient to release the air brakes on the car. A draft load sensor is positioned in the air line between the valve and the air pressure activated unit. The draft load sensor normally blocks the air line, but unblocks it when a sufficiently great draft load is sensed so the air pressure activated unit can force the release of the hand brake. Thus, the hand brake is released only if source air pressure is sufficiently high and the draft load on the railroad car is sufficiently great. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
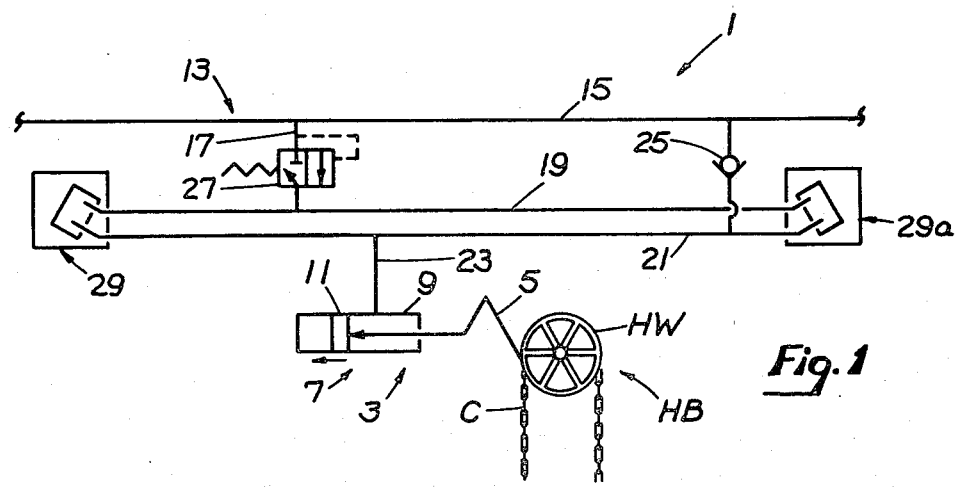
FIG. 1 is a schematic representation of a hand brake release apparatus of the present invention.

Referring to the drawings, apparatus of the present invention is indicated generally 1 in FIG. 1 and is for automatically releasing a hand brake HB on a railroad car (not shown). The hand brake is used to prevent movement of the car in a railyard or similar location and is separate from the air braking system with which the car is equipped for stopping the car when it is part of a moving train. Typically, hand brake HB includes a hand wheel HW and a drive chain C which engages the hand wheel to turn the wheel or be moved by turning the wheel.

Apparatus 1 includes a hand brake release means 3 comprising a lever 5, one of which engages hand wheel HW to prevent the wheel from turning. An air pressure activated means 7 includes an air cylinder 9 having a piston 11 movable in the cylinder. The other end of lever 5 is attached to piston 11 and application of air pressure to the backside of the piston moves it to the left as viewed in FIG. 1. This, in turn, moves the lever out of engagement with hand wheel HW thereby releasing hand brake HB.

An air line 13 directs pressurized air from an air source (not shown) to air cylinder 9. Air line 13 includes a train line 15 which extends the length of a train and is comprised of individual line sections for each car which are coupled together throughout the length of the train. Train line 15 is used to direct air to the air brakes on each railroad car to stop the train. Pressurized air is directed from train line 15 to air cylinder 9 via conduits 17, 19, 21 and 23; conduit 17 being connected to the train line and to conduit 19, conduits 19 and 21 being connected in parallel and coupled together at each end, and conduit 23 extending between conduit 21 and the air cylinder. A check valve 25 is connected between train line 15 and line segment 21 for safety purposes.

A sequence valve 27 is connected in air line 13 and specifically, in conduit 17 between the train line and conduit 19. Sequence valve 19 is normally closed thereby blocking the air flow path between train line 15 and air cylinder 9. Valve 19 is, however, responsive to the air pressure level in the train line and when this pressure reaches a level sufficient to release the air brakes on the railroad car, sequence valve 19 opens and remains open so long as the train line air pressure level remains above that required to release the air brakes.

Figure 2:
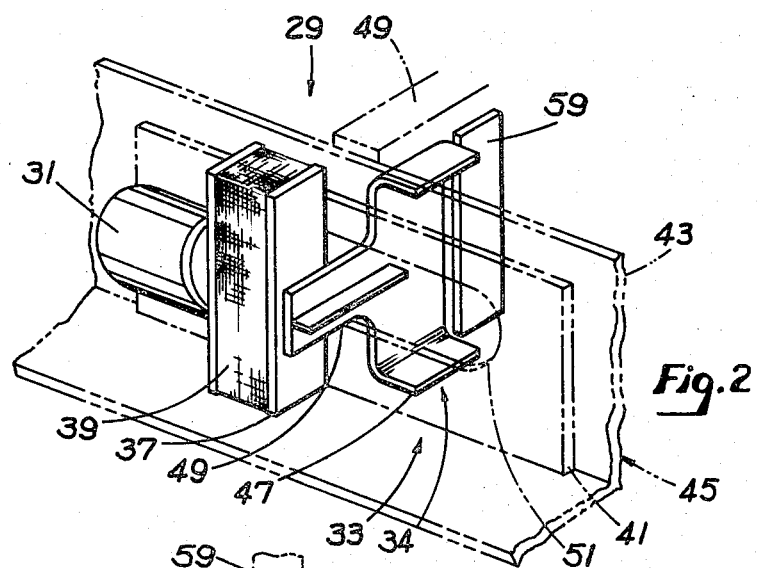
FIG. 2 is a perspective of a draft load sensor of the apparatus.
Figure 3:
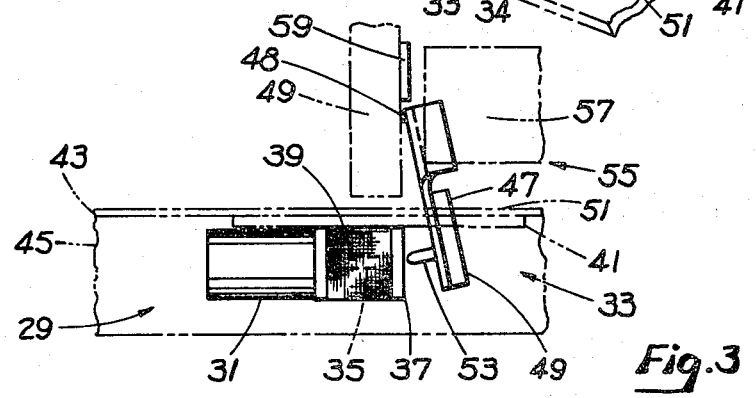
FIG. 3 is a top plan view of the draft load sensor shown in FIG. 2.

Referring to FIGS. 2 and 3, a draft load sensing means 29 is positioned in air line 13 between sequence valve 27 and air cylinder 9. Sensing means 29 includes an air valve 31 normally blocking the air line and means 33 for opening the air valve to unblock the air line when a sufficiently great draft load is exerted on the railroad car. Preferably means 33 is a mechanical means. Means 34 includes a valve plunger 35 (see FIG. 3) movable between a first position (the position shown in FIG. 3) for which air valve 31 is closed and a second position opening the air valve. Valve plunger 35 is attached to plate 37 and a rubber spring 39 acts on the plate to bias the valve plunger to its first or air valve closing position. It will be understood that other bias means can be employed besides the rubber spring to bias valve plunger 35 to its first position. Air valve 31 is mounted on a doubler plate 41 which, in turn, is attached to the upright arm 43 of a center sill 45 of the railroad car.

Mechanical means 34 further includes a lever 47 hingedly connected at one end to a block 48. Lever 47 has a lever arm 49 extending through a longitudinal slot 51 in plate 41 and center sill arm 43. An adjustable screw 53 is attached to the outer end of lever arm 49 and contacts plate 37. A draft gear plunger 55 (see FIG. 3) comprises a flat plate 57 slidable along the longitudinal axis of the railroad car. That is, the plate slides back and forth along the length of the railroad car, the movement of the plate being to a greater or lesser extent depending upon the draft load forces to which the car is subjected. Follower 49 has a spacer pad 59 secured to one face and the end of the plate strikes this pad if it moves sufficiently far. During such a movement, draft gear plunger 55 also strikes lever 47 and lever arm 49 rotates clockwise as shown in FIG. 3 so screw 53, bearing against plate 37, forces plunger 35 to the left. This moves valve plunger 35 from its first to second position thereby opening air valve 31.

Operation of apparatus 1 is therefore as follows. If the railroad car is subjected to a draft load force sufficient to move draft gear plunger 55 to strike lever 47, air valve 31 is opened in the manner described above. If train line pressure is sufficiently high, sequence valve 27 is also opened and pressurized air is applied to air cylinder 9 thus moving piston 11 and the lever 5 attached thereto and releasing hand brake HB. If train line pressure is sufficiently high so sequence valve 27 is open, but the railroad car is not subjected to a sufficiently great draft load force so draft load sensing means 29 blocks the air line to air cylinder 9, hand brake HB cannot be released. Conversely, if the railroad car is subjected to a sufficiently high draft load force so air valve 31 is opened, but train line pressure is too low, sequence valve 27 remains closed and the air line between train line 15 and air cylinder 9 remains blocked and hand brake HB cannot be released. The hand brake can be released only if both operating conditions are met simultaneously, that is, train line pressure must be high enough to release the air brakes on the car and the draft load force to which the car is subjected must be sufficiently high. Otherwise, hand brake HB remains applied.

The sensed draft load sufficient to open air valve 31 is preferably that just above the load which causes the wheels of the car to drag. Under static operating conditions, the hand brake remains applied even though the air brakes of the car are released and the car is subjected to minor jostling. Normal train action, however, causes the minimum draft load force necessary to cause opening of air valve 31 to be quickly exceeded and the hand brake released.

Preferably, and as shown in FIG. 1, apparatus 1 includes two draft load sensing means 29 and 29A. These means are respectively located at opposite ends of the railroad car. Sensing by either sensing means of a sufficiently high draft load force will activate air cylinder 9 to release hand brake HB if, as noted, train line pressure is also sufficiently high. Once activated, air cylinder 9 remains activated until train line pressure is reduced to zero and does not interfere with normal operation of the hand brake.

In view of the above, it will be seen that the several objects of the invention are achieved and other advantageous results obtained.

As various changes could be made in the above constructions without departing from the scope of the invention, it is intended that all matter contained in the above description and shown in the accompanying drawings shall be interpreted as illustrative and not in a limiting sense.

What is claimed is

1. Apparatus for automatically releasing a railroad car hand brake comprising:
hand brake release means normally maintaining the hand brake in its applied position; air pressure activated means acting on the release means to force the release means to release the hand brake; an air conduit directing pressurized air from a pressurized air source to the air pressure activated means; valve means connected in the air line and responsive to the source air pressure, the valve means being normally closed, but opening when the source air pressure reaches a level sufficient to release the air brakes on the car; and draft load sensing means positioned in the air line between the valve means and the air pressure activated means, the draft load sensing means normally blocking the air line, but unblocking it when a sufficiently great draft load is sensed so the air pressure activated means can force the release means to release the hand brake whereby the hand brake is released only if source air pressure is sufficiently high and the draft load on the railroad car is sufficiently great.

2. Apparatus as set forth in claim 1 wherein the draft load sensing means comprises an air valve having an air inlet and a normally closed air outlet and means for opening the air outlet and thereby unblocking the air conduit when the draft load is sufficiently great.

3. Apparatus as set forth in claim 2 wherein the means for opening the air outlet is a mechanical means.

4. Apparatus as set forth in claim 2 wherein the mechanical means includes a valve plunger movable between a first position closing the air outlet of the air valve and a second position opening the air outlet and means biasing the valve plunger to its first position.

5. Apparatus as set forth in claim 3 wherein the mechanical means further includes a sensing lever acting on the valve plunger to move it from its first to its second position against the force of bias means and sensing lever actuating means movable in response to the draft load exerted on the railroad car for actuating the sensing lever.

6. Apparatus as set forth in claim 4 wherein the mechanical means comprises a block to which the lever is pivotally attached and a draft gear plunger for striking the lever and forcing it to move the air valve plunger from its first to its second position, the draft gear plunger being movable relative to the block in response to the draft load to which the railroad car is subjected and striking against the lever when draft load on the railroad car is sufficiently great.

7. Apparatus as set forth in claim 5 wherein the air valve, lever, block, and draft load plunger are located at one end of the railroad car and the draft load sensing means further includes a second air valve, lever, block, and draft load plunger located at the other end of the railroad car, the air conduit being connected in parallel to both air valves whereby subjection of either end of the railroad car to a sufficient draft load causes automatic release of the hand brake.

8. Apparatus as set forth in claim 1 wherein the hand brake release means includes a hand brake lever, one end of which contacts the hand brake and prevents movement thereof.

9. Apparatus as set forth in claim 8 wherein the air pressure activated means includes an air cylinder and a piston movable in the cylinder when air pressure is applied thereto.

10. Apparatus as set forth in claim 9 wherein the other end of the hand brake lever is attached to the piston for the piston to move the hand brake lever when air pressure is applied to the cylinder, movement of the hand brake lever by the piston when air pressure is applied to the cylinder pulling the one end of the hand brake lever away from the hand brake thereby releasing the hand brake.

11. Apparatus as set forth in claim 10 wherein the draft load sensing means comprises an air valve and means for opening the air valve in response to a sufficiently high draft load exerted on the railroad car.

12. Apparatus as set forth in claim 11 wherein the valve opening means includes a mechanical linkage.

13. Apparatus as set forth in claim 12 wherein the mechanical linkage includes a valve plunger movable between a first position closing the air valve and a second position opening the air valve, means biasing the valve plunger to its first position, and a draft valve plunger movable in response to the draft load exerted on the railroad car for striking the sensing lever and forcing it against the valve plunger to move the plunger.

14. Apparatus as set forth in claim 13 wherein the draft load sensing means further includes a block to which the second lever is pivotally attached, the draft load sensor being movable relative to the block.

15. Apparatus as set forth in claim 14 wherein the air valve, second lever, draft load plunger, and block are located at one end of the railroad car and a second air valve, second lever, draft load plunger, and block are located at the other end of the car, the air conduit being connected to both air valves whereby a sufficiently high draft load exerted on either end of the car causes automatic release of the hand brake.

* * * * *